(12) United States Patent
Baba

(10) Patent No.: US 11,836,105 B2
(45) Date of Patent: Dec. 5, 2023

(54) COMMUNICATION DEVICE, INFORMATION PROCESSING SYSTEM, AND COMMUNICATION METHOD

(71) Applicant: NEC Corporation, Tokyo (JP)

(72) Inventor: Kiyoshi Baba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 254 days.

(21) Appl. No.: 17/296,394

(22) PCT Filed: Nov. 21, 2019

(86) PCT No.: PCT/JP2019/045601
§ 371 (c)(1),
(2) Date: May 24, 2021

(87) PCT Pub. No.: WO2020/110895
PCT Pub. Date: Jun. 4, 2020

(65) Prior Publication Data
US 2022/0019551 A1 Jan. 20, 2022

(30) Foreign Application Priority Data
Nov. 30, 2018 (JP) .................................. 2018-224572

(51) Int. Cl.
*G06F 13/42* (2006.01)
*H04L 45/74* (2022.01)

(52) U.S. Cl.
CPC .......... *G06F 13/4282* (2013.01); *H04L 45/74* (2013.01); *G06F 2213/0026* (2013.01)

(58) Field of Classification Search
CPC ......... G06F 13/4282; G06F 2213/0026; H04L 45/74
See application file for complete search history.

(56) References Cited

U.S. PATENT DOCUMENTS 7,480,303 B1 1/2009 Ngai
2008/0256090 A1 10/2008 Dietterich et al.
(Continued)

FOREIGN PATENT DOCUMENTS

JP S63-111563 A 5/1988
JP H06-019856 A 1/1994
(Continued)

OTHER PUBLICATIONS

Extended European Search Report for EP Application No. EP19890545.7 dated Dec. 10, 2021.
(Continued)

*Primary Examiner* — Henry Tsai
*Assistant Examiner* — Harry Z Wang

(57) ABSTRACT

A communication device mounted in each of a plurality of information processing devices connected to a fabric, the communication device comprises: a serial interface that transmits and receives a first packet compliant with a Peripheral Component Interconnect Express (PCIe) standard; a requester unit that acquires the first packet from the serial interface and converts the first packet that has been acquired into a second packet that is transmitted and received via the fabric among a plurality of the information processing devices sharing a memory space that is virtually extended by using a device identifier specific to each of the information processing devices; a fabric communication unit that transmits and receives the second packet via the fabric; and a completer unit that acquires the second packet from the fabric communication unit and generating a response packet to a request included in the second packet that has been acquired.

10 Claims, 13 Drawing Sheets

(56) References Cited

U.S. PATENT DOCUMENTS

| | | | |
|---|---|---|---|
| 2012/0183001 A1 | 7/2012 | Suzuki et al. | |
| 2013/0159638 A1* | 6/2013 | Koinuma | G06F 12/1441 |
| | | | 711/E12.001 |
| 2014/0245053 A1 | 8/2014 | Yoshikawa et al. | |
| 2014/0314083 A1 | 10/2014 | Gorodetsky et al. | |
| 2014/0376548 A1* | 12/2014 | Naven | H04L 49/30 |
| | | | 370/389 |
| 2015/0095518 A1 | 4/2015 | Suzuki et al. | |
| 2015/0261709 A1* | 9/2015 | Billi | G06F 13/404 |
| | | | 710/316 |
| 2016/0283399 A1* | 9/2016 | Das Sharma | G06F 12/1072 |
| 2019/0179784 A1 | 6/2019 | Tsuji et al. | |

FOREIGN PATENT DOCUMENTS

| | | |
|---|---|---|
| JP | H10-254761 A | 9/1998 |
| JP | 2009-110032 A1 | 5/2009 |
| JP | 2013-130976 A | 7/2013 |
| WO | 2011/090145 A1 | 7/2011 |
| WO | 2013/046814 A1 | 4/2013 |
| WO | 2013/150792 A1 | 10/2013 |
| WO | 2018/003629 A1 | 1/2018 |

OTHER PUBLICATIONS

Japanese Office Action for JP Application No. 2018-224572 dated Apr. 13, 2021 with English Translation.
International Search Report for PCT Application No. PCT/JP2019/045601, dated Feb. 10, 2020.
English translation of Written opinion for PCT Application No. PCT/JP2019/045601, dated Feb. 10, 2020.

\* cited by examiner

Fig.5

131 DESTINATION MANAGEMENT TABLE

| FIRST TWO bits OF ADDRESS | TIME T1 | TIME T2 | TIME T3 |
|---|---|---|---|
| 00 | DEVICE A | DEVICE E | DEVICE E |
| 01 | DEVICE B | DEVICE B | DEVICE B |
| 10 | DEVICE C | DEVICE C | DEVICE A |
| 11 | DEVICE D | DEVICE D | DEVICE D |

Fig.6

132 FIRST PACKET MANAGEMENT TABLE

| TAG VALUE | IN-USE FLAG | TRANSMISSION DESTINATION IDENTIFIER | COMPLETION GENERATING INFORMATION |
|---|---|---|---|
| 0 | 1 | A0 | C0 |
| 1 | 0 | A1 | C1 |
| 2 | 1 | A2 | C2 |
| ... | ... | ... | ... |
| N | 0 | AN | CN |

Fig.8

133 SECOND PACKET MANAGEMENT TABLE

| TAG VALUE | IN-USE FLAG | TRANSMISSION DESTINATION IDENTIFIER |
|---|---|---|
| 0 | 1 | A0 |
| 1 | 0 | A1 |
| 2 | 1 | A2 |
| ... | ... | ... |
| N | 0 | AN |

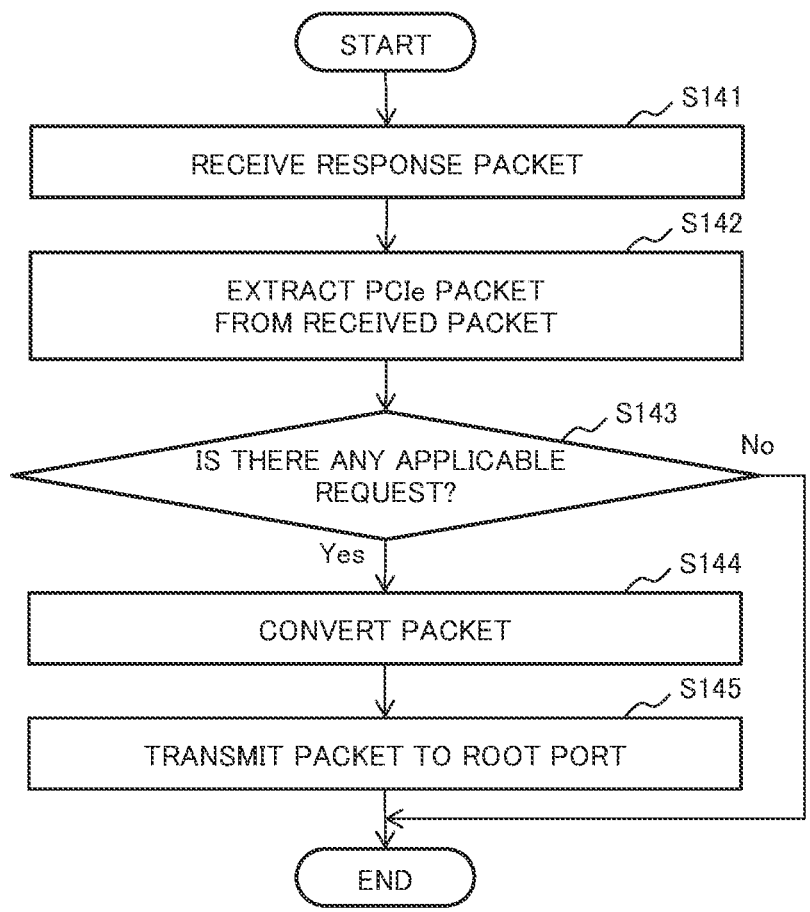

COMMUNICATION DEVICE, INFORMATION PROCESSING SYSTEM, AND COMMUNICATION METHOD

This application is a National Stage Entry of PCT/JP2019/045601 filed on Nov. 21, 2019, which claims priority from Japanese Patent Application 2018-224572 filed on Nov. 30, 2018, the contents of all of which are incorporated herein by reference, in their entirety.

TECHNICAL FIELD

The present invention relates to a communication device, an information processing system, and a communication method.

BACKGROUND ART

To share a memory space among a plurality of information processing devices, Remote Direct Memory Access (RDMA), Non-Transparent Bridge (NTB), or the like is used. When RDMA is used, processing overhead is present because each information processing device individually manages the memory space. When NTB is used, although the memory space of another information processing device can be directly accessed, a limitation of 64 bits is imposed because the access is based on PCIe Express (registered trademark) (PCI: Peripheral Component Interconnect).

PTL 1 discloses an inter-processor communication method by which data is transferred from a virtual space of a process in a certain cluster to a virtual space of a process in another cluster without copying the data to a buffer provided inside an operating system. According to the method described in PTL 1, the beginning address of the virtual communication area in a user process is set to the same value in every cluster, and the virtual communication area is allocated to the real communication area in continuous areas on the memory sequentially from the head of the area.

PTL 2 discloses a computer system having a shared addressable memory space. The system of PTL 2 includes a persistent memory device and a plurality of computers. The persistent memory device is connected to a data network that transmits data signals representing computer-readable information and has a persistent storage area for the data signals. Each computer includes an interface for accessing a data network to exchange data signals, and a shared memory subsystem for mapping a portion of the addressable memory space to a portion of the persistent storage area to provide an addressable persistent storage area for data signals.

PTL 3 discloses a memory access method for a multiprocessor system in which a plurality of processors is connected to a multiprocessor bus.

CITATION LIST

Patent Literature

[PTL 1] JP H06-019856 A
[PTL 2] JP H10-254761 A
[PTL 3] JP S63-111563 A

SUMMARY OF INVENTION

Technical Problem

According to the method of PTL 1, a memory can be shared by calculating the address of the transmission destination in advance. However, the method of PTL 1 is problematic in that it is impossible to connect a completely different information processing device in a non-cluster configuration to share a memory with such information processing device.

The system of PTL 2 enables to share a memory by providing a virtual shared memory on a network. However, the system of PTL 2 is problematic in that a shared memory is divided based on pages and any single device is allowed to have access to each page, and thus a plurality of devices is unable to refer to the same page.

The method of PTL 3 is problematic in that devices need to have an identical and fixed configuration because the access destination is determined based on a memory address, and thus any device can not always be accessed.

An object of the present invention is, in order to solve the above-described problems, to provide a communication device that enables a plurality of information processing devices to share a memory space.

Solution to Problem

A communication device according to one aspect of the present invention is mounted in each of a plurality of information processing devices connected to a fabric, the communication device including: a serial interface for transmitting and receiving a first packet compliant with a Peripheral Component Interconnect Express (PCIe) standard; a requester unit for acquiring the first packet from the serial interface and converting the first packet that has been acquired into a second packet that is transmitted and received via the fabric among a plurality of the information processing devices sharing a memory space that is virtually extended by using a device identifier specific to each of the information processing devices; a fabric communication unit for transmitting and receiving the second packet via the fabric; and a completer unit for acquiring the second packet from the fabric communication unit and generating a response packet to a request included in the second packet that has been acquired.

An information processing system according to one aspect of the present invention includes: a plurality of information processing devices; a fabric connected to a plurality of the information processing devices; and a communication device mounted in each of the plurality of the information processing devices, the communication device including: a serial interface for transmitting and receiving a first packet compliant with a Peripheral Component Interconnect Express (PCIe) standard; a requester unit for acquiring the first packet from the serial interface and converting the first packet that has been acquired into a second packet that is transmitted and received via the fabric among a plurality of the information processing devices sharing a memory space that is virtually extended by using a device identifier specific to each of the information processing devices; a fabric communication unit for transmitting and receiving the second packet via the fabric; and a completer unit for acquiring the second packet from the fabric communication unit and generating a response packet to a request included in the second packet that has been acquired.

A communication method according to one aspect of the present invention is a communication method in an information processing system including a plurality of information processing devices connected to a fabric, the communication method including: receiving a first packet compliant with a Peripheral Component Interconnect Express (PCIe) standard; converting the first packet that has been received into a second packet that is transmitted and received via the fabric among a plurality of the information processing devices sharing a memory space that is virtually extended by using a device identifier specific to each of the information processing devices; transmitting and receiving the second packet via the fabric; and generating a response packet to a request included in the second packet that has been acquired.

Advantageous Effects of Invention

The present invention makes it possible to provide a communication device that enables a plurality of information processing devices to share a memory space.

BRIEF DESCRIPTION OF DRAWINGS

FIG. 5 is an example of a destination management table used by the communication device according to an example embodiment of the present invention.

FIG. 6 is an example of a first packet management table used by the communication device according to an example embodiment of the present invention.

FIG. 8 is an example of a second packet management table used by the communication device according to an example embodiment of the present invention.

FIG. 13 is a flowchart for explaining an example of a response receiving process performed by the communication device according to an example embodiment of the present invention.

EXAMPLE EMBODIMENT

Figure 1:
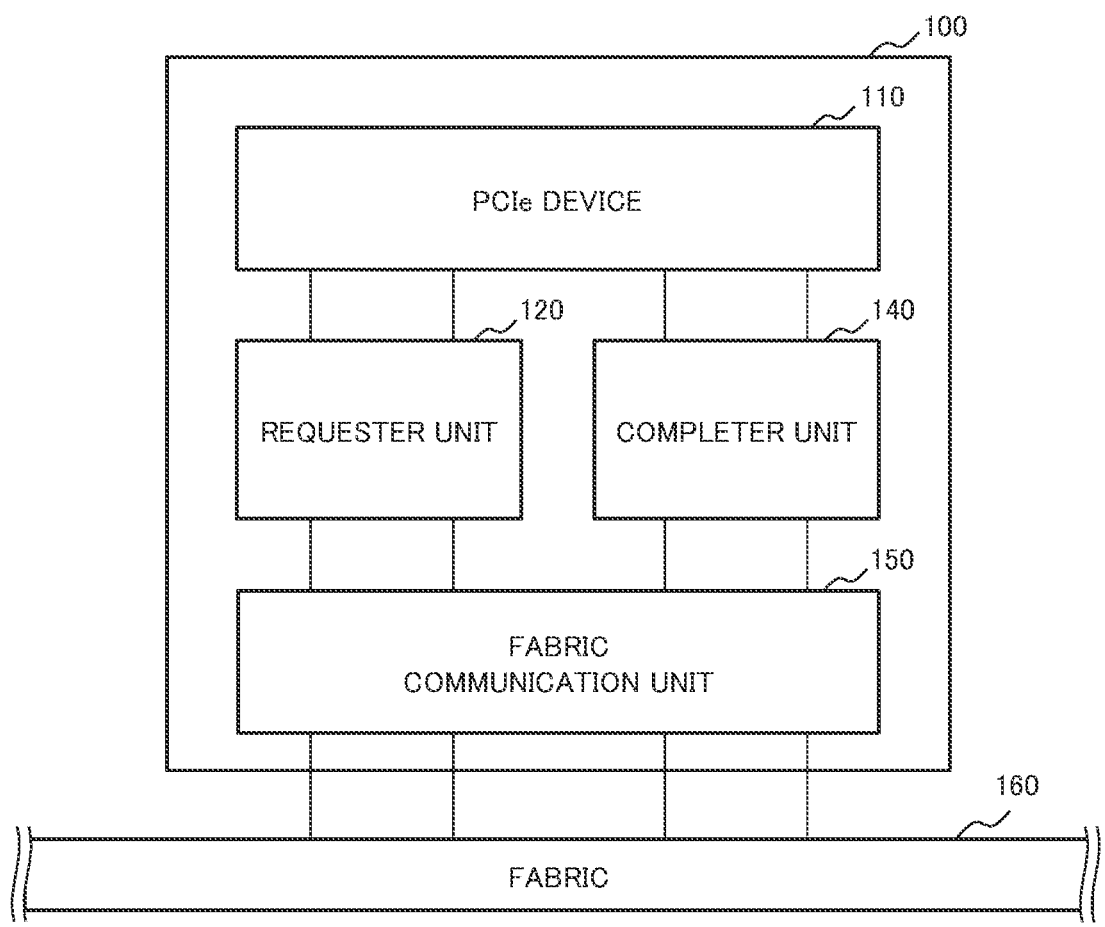
FIG. 1 is a block diagram illustrating an example of a general configuration of a communication device according to an example embodiment of the present invention.

An example embodiment of the present invention will now be described with reference to the drawings. It should be noted that although the following example embodiment has technically preferable limitations for carrying out the present invention, the scope of the present invention is not limited thereto. Unless otherwise justified, identical reference numerals are given to similar parts throughout all the drawings used for describing the following example embodiment. In the example embodiment below, a repeated description about similar configurations or operations may be omitted. The orientation indicated by an arrow in the drawings represents an example only, and it does not limit the direction of a signal between blocks.

EXAMPLE EMBODIMENT

First, a communication device according to an example embodiment of the present invention will be described with reference to the drawings. The communication device of the present example embodiment is mounted in an information processing device based on a technology capable of extending PCI Express (registered trademark, hereinafter also referred to as PCIe) to a fabric (PCI: Peripheral Component Interconnect). In the present example embodiment, a memory space is virtually extended by using an identifier uniquely assigned to each device like a media access control (MAC) address as high-order bits of the memory space. In the present example embodiment, non-transparent bridging (NTB) is performed based on a virtual address.

(Configuration)

FIG. 1 is a block diagram illustrating an example of a general configuration of a communication device 100 according to the present example embodiment. As illustrated in FIG. 1, the communication device 100 includes a PCIe device 110, a requester unit 120, a completer unit 140, and a fabric communication unit 150. The fabric communication unit 150 is connected to a fabric 160.

For example, the fabric 160 is implemented by a local network such as Ethernet (registered trademark). Components included in the communication device 100 are connected to each other via lanes each including a differential pair of transmission and reception. The transmission line and the reception line constituting a lane include at least one conductive line. The communication device 100 is mounted in an information processing device such as a computer or server that includes at least one central processing unit (CPU) and a memory.

Figure 2:
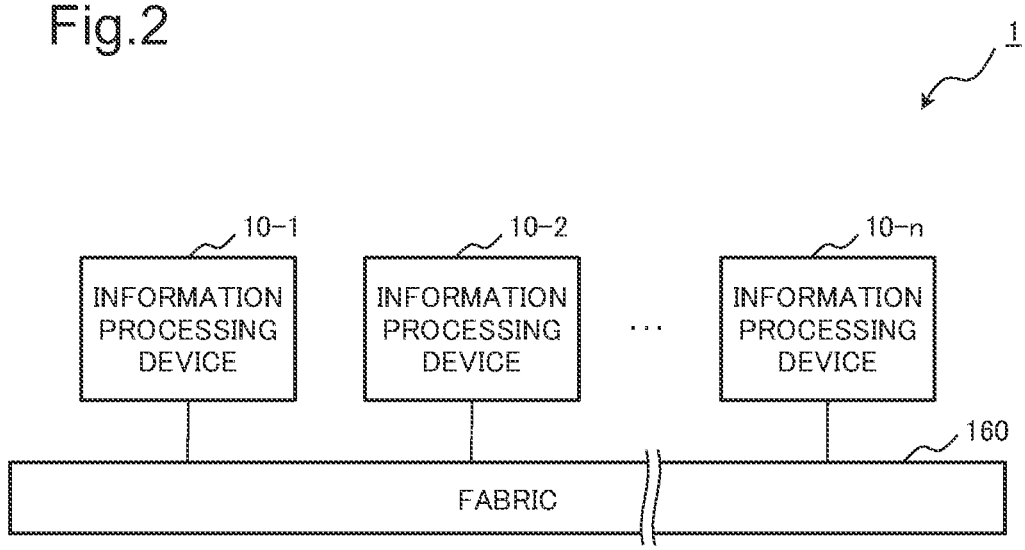
FIG. 2 is a block diagram illustrating an example of a configuration of an information processing system including the communication device according to an example embodiment of the present invention.

FIG. 2 shows an information processing system 1 including a plurality of information processing devices 10-1 to 10-$n$ each having the communication device 100 mounted therein (n is a natural number). In the following description, the plurality of information processing devices 10-1 to 10-$n$ is simply referred to as the information processing device 10 when these information processing devices are not distinguished from one another. In the following description, the information processing device 10 itself may be referred to as the subject device, and any information processing device 10 other than the subject device may be referred to as another device. Each information processing device 10 (subject device) included in the information processing system 1 in FIG. 2 is connected to another device via the fabric 160 to share a memory space with another device.

Figure 3:
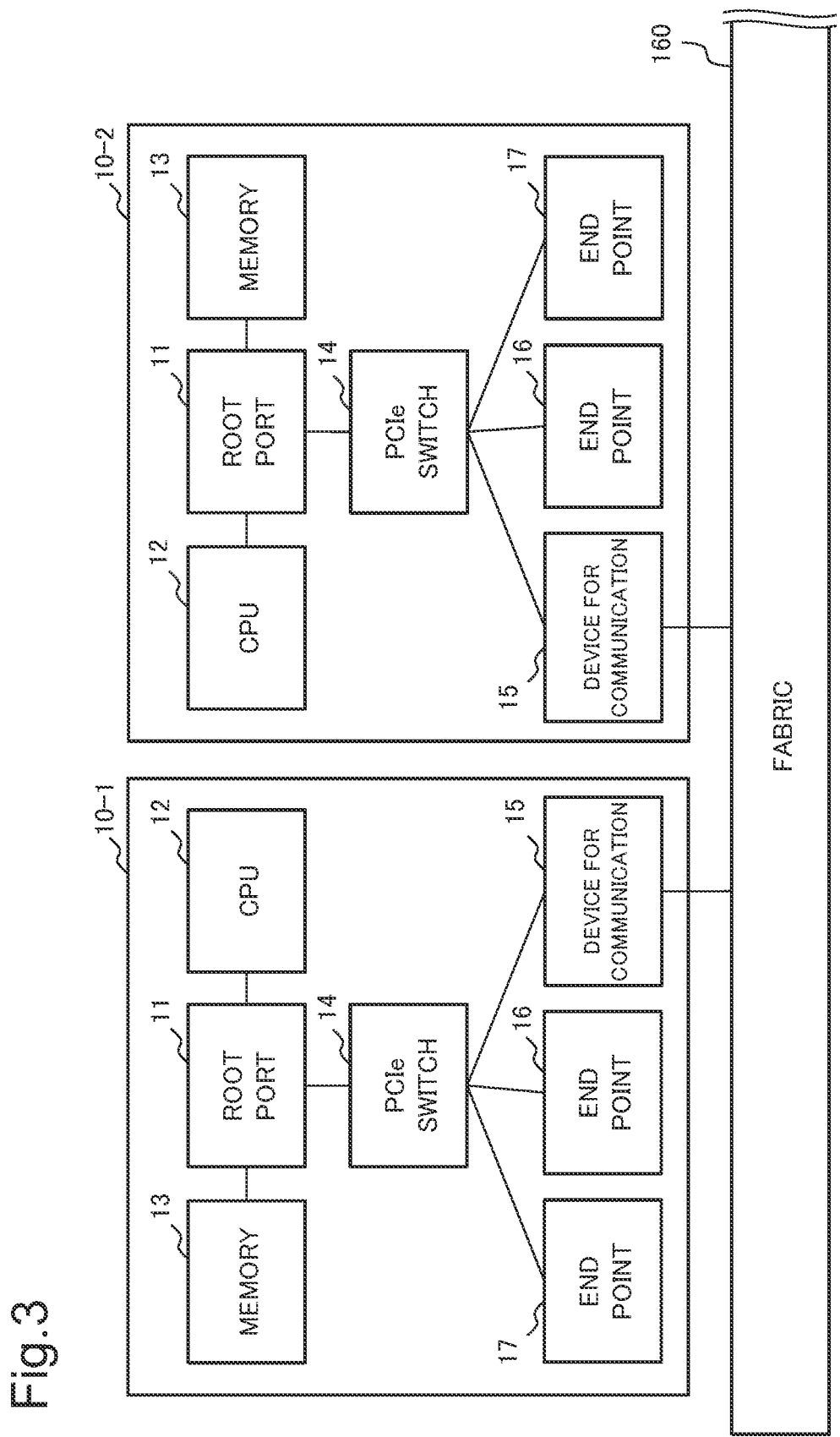
FIG. 3 is a block diagram illustrating an example of a configuration of an information processing device in which the communication device according to an example embodiment of the present invention is mounted.

FIG. 3 is a block diagram illustrating an example of a hardware configuration implementing the information processing device 10. As illustrated in FIG. 3, the communication device 100 includes a root port 11, a CPU 12, a memory 13, a PCIe switch 14, a device for communication 15, an end point 16, and an end point 17. The communication device 100 is mounted inside the device for communication 15.

The root port 11 includes at least one PCIe port. The root port 11 is connected to at least one PCIe switch 14 and to a PCIe device (not illustrated) via the PCIe port. For example, the root port 11 is connected to a PCIe device such as PCIe graphics via the PCIe port. The root port 11 further includes a built-in host bridge and is connected to the CPU 12 and the memory 13. For example, the root port 11 is connected to the CPU 12 via a system bus and is connected to the memory 13 via a memory bus.

The CPU 12 is connected to the root port 11. For example, the CPU 12 is connected to the root port 11 via a system bus. The CPU 12 is implemented by a general central processing unit.

The memory 13 is connected to the root port 11. For example, the memory 13 is connected to the root port 11 via a memory bus. The memory 13 is implemented by a general main memory device.

The PCIe switch 14 includes a plurality of PCIe ports. The PCIe switch 14 is connected to the root port 11, the device for communication 15, the end point 16, and the end point 17 via the PCIe ports. The PCIe switch 14 routes a packet among the ports. The example in FIG. 3 shows that each of the information processing devices 10-1 and 10-2 includes one PCIe switch 14, but each of the information processing devices 10-1 and 10-2 may include a plurality of PCIe switches 14.

The device for communication 15 includes a plurality of PCIe ports. The device for communication 15 is connected to the PCIe switch 14 and the fabric 160 via the PCIe ports. The device for communication 15, which is a device compliant with the PCIe standard, has a configuration register and other standard functions implemented therein. The communication device 100 is mounted in the device for communication 15.

Before the memory 13 is shared among a plurality of the information processing devices 10, the following two settings are made to the device for communication 15.

(1) As in a general I/O device, a PCI bus number and a BAR space are allocated by PCI enumeration software.

(2) When the OS is started, a device driver for the device for communication 15 is loaded and the initial settings necessary for operation are made.

The end point 16 and the end point 17 each include at least one PCIe port. For example, each of the end point 16 and the end point 17 is a legacy end point, a PCIe end point, a root complex end point, or the like. The example in FIG. 3 shows that each of the information processing devices 10-1 and 10-2 includes two end points (the end points 16 and 17), but each of the information processing devices 10-1 and 10-2 may include three or more end points.

The foregoing has described an example of the hardware configuration implementing the information processing device 10. Note that the hardware configuration in FIG. 3 is merely an example, and the hardware configuration implementing the information processing device 10 is not limited to the precise forms.

[Communication Device]

Referring back to FIG. 1, the following describes components of the communication device 100 with reference to the drawing. To access another device, the information processing device 10 accesses a BAR space allocated in the device for communication 15 within the subject device. Having accessed the BAR space within the subject device, the information processing device 10 transmits a request packet to the requester unit 120. In this case, allocation may be made in the BAR space in any manner. For example, an internal control function may be allocated to BAR 0/1, and a communication function may be allocated to BAR 2/3.

As illustrated in FIG. 1, the PCIe device 110 (also referred to as a serial interface) is connected to the requester unit 120 and the completer unit 140. The PCIe device 110 is also connected to the PCIe switch 14.

The PCIe device 110 receives a packet (also referred to as a first packet) from the root port 11 via the PCIe switch 14. The PCIe device 110 outputs the received packet to either the requester unit 120 or the completer unit 140. For example, upon receipt of a request packet (also referred to as the request packet) from the root port 11, the PCIe device 110 outputs the received request packet to the requester unit 120. Upon receipt of a response packet (also referred to as the completion packet) from the root port 11, the PCIe device 110 outputs the received request packet to the requester unit 120.

Furthermore, the PCIe device 110 receives a packet from either the requester unit 120 or the completer unit 140. The PCIe device 110 transmits the received packet to the root port 11 via the PCIe switch 14. For example, upon receipt of a response packet from the requester unit 120, the PCIe device 110 transmits the received response packet to the root port 11. On the other hand, upon receipt of a request packet from the completer unit 140, the PCIe device 110 transmits the received request packet to the root port 11.

The requester unit 120 is connected to the PCIe device 110 and to the fabric communication unit 150. The requester unit 120 operates when the communication device 100 functions as a requester.

The requester unit 120 acquires a request packet from the PCIe device 110. On the basis of the address in the acquired request packet, the requester unit 120 determines whether access to the base address register (BAR) space for communicating with another device is present. The requester unit 120 refers to the destination management table stored in the subject device to determine the transmission destination of the acquired request packet. The destination management table is a table for determining to which communication device 100 a request packet is to be transferred.

If access to the BAR space for communicating with another device is present, the requester unit 120 refers to the destination management table to determine, on the basis of the address in the request packet, to which information processing device 10 the request packet is to be transferred. In this process, the requester unit 120 generates a packet by carrying out conversion of the tag field in the request packet. The requester unit 120 outputs the generated packet to the fabric communication unit 150. On the other hand, if access to the BAR space for communicating with another device is absent, the requester unit 120 performs processing by treating the acquired request packet as a usual PCIe packet.

In response to the request included in the request packet been memory read, the requester unit 120 stores information in a first packet management table. The first packet management table is a table for recording a set of information (also referred to as conversion information) including the converted tag information, an in-use flag regarding the tag information, the destination information (a transmission destination identifier), and the information necessary for generating a completion (completion generating information). The requester unit 120 gives, to the tag field to be converted, the tag information that is unused in the first packet management table. The completion generating information includes original tag information, a requester ID, a byte count, and the like. On the other hand, if the request included in the request packet is memory write, the requester unit 120 does not register any information in the first packet management table because no completion is to be returned.

The completer unit 140 is connected to the PCIe device 110 and to the fabric communication unit 150. The completer unit 140 operates when the communication device 100 functions as a completer.

The completer unit 140 receives a request packet from another information processing device 10 via the fabric communication unit 150. The completer unit 140 extracts a PCIe packet from the received request packet and carries out conversion of the packet. Specifically, the completer unit 140 replaces the transmission source identifier field in the packet with the transmission source identifier of the subject device and carries out conversion of the tag field.

The completer unit 140 stores the conversion information in a second packet management table. The second packet management table is a table for recording the conversion information including a set of the converted tag information, an in-use flag regarding the tag information, and the destination information regarding the requester (referred to as a transmission source identifier). The completer unit 140 gives, to the tag field to be converted, the tag information that is unused in the second packet management table. The converted packet is transmitted to the root port 11 of the subject device as if the converted packet has been issued by the device for communication 15 of the subject device. If the request included in the request packet is memory write, the process is now completed.

On the other hand, in response to the request included in the request packet been memory read, a response packet (also referred to as a completion packet) is returned from the root port 11 of another information processing device 10 (another device). The completer unit 140 refers to the second packet management table to determine to which request the received response packet is responding. If there is any applicable request, the completer unit 140 acquires the transmission source identifier from the information stored in the second management table, restores the original tag field, and then transmits a response packet to the fabric 160. The response packet transmitted to the fabric 160 reaches another device of the specified destination.

The fabric communication unit 150 is connected to the requester unit 120 and to the completer unit 140. The fabric communication unit 150 is also connected to the fabric 160. Via the fabric 160, the fabric communication unit 150 is connected to the fabric communication unit 150 of another information processing device 10 (also referred to as another device). The fabric communication unit 150 transmits and receives a packet (also referred to as a second packet) to and from the fabric 160.

The foregoing has described an example of the general configuration of the communication device 100. Note that the configuration of the communication device 100 in FIG. 1 is merely an example, and the configuration of the communication device 100 of the present example embodiment is not limited to the precise forms.

[Requester Unit]

Figure 4:
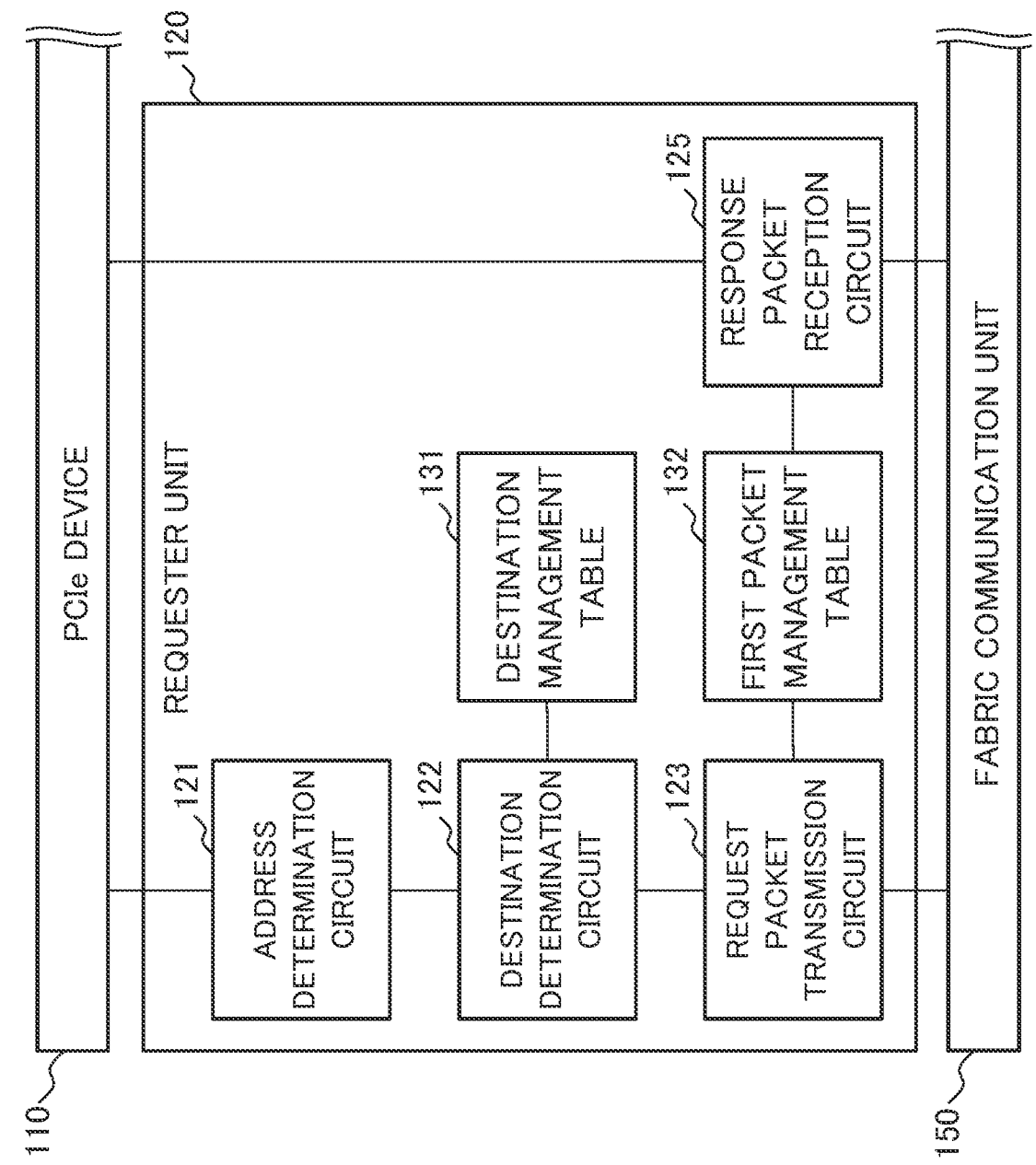
FIG. 4 is a block diagram illustrating an example of a configuration of a requester unit included in the communication device according to an example embodiment of the present invention.

Referring to the drawings, the following describes the requester unit 120 included in the communication device 100. FIG. 4 is a block diagram illustrating an example configuration of the requester unit 120. As illustrated in FIG. 4, the requester unit 120 includes an address determination circuit 121, a destination determination circuit 122, a request packet transmission circuit 123, and a response packet reception circuit 125. The requester unit 120 further includes the destination management table 131 and the first packet management table 132. The destination management table 131 and the first packet management table 132 are stored in a storage circuit (not illustrated). The destination management table 131 and the first packet management table 132 may be stored in different storage circuits, or may be stored in different storage areas in the same storage circuit.

The address determination circuit 121 is connected to the PCIe device 110 and the destination determination circuit 122. The address determination circuit 121 acquires a request packet from the PCIe device 110. On the basis of the address in the acquired request packet, the address determination circuit 121 determines whether access to the BAR space for communicating with another device is present. If access to the BAR space for communicating with another device is present, the address determination circuit 121 outputs the acquired request packet to the destination determination circuit 122. If access to the BAR space for communicating with another device is absent, the acquired request packet is handled as a usual PCIe packet.

The destination determination circuit 122 is connected to the address determination circuit 121 and the request packet transmission circuit 123. In addition, the destination determination circuit 122 refers to the destination management table 131. The destination determination circuit 122 acquires a request packet from the address determination circuit 121. The destination determination circuit 122 refers to the destination management table 131 to determine to which information processing device 10 the request packet is to be transmitted. Having determined the destination of the request packet, the destination determination circuit 122 outputs the request packet and destination to the request packet transmission circuit 123.

The request packet transmission circuit 123 is connected to the destination determination circuit 122 and the fabric communication unit 150. In addition, the request packet transmission circuit 123 refers to the first packet management table 132. The request packet transmission circuit 123 generates a packet by carrying out conversion of the request packet. The request packet transmission circuit 123 transmits the generated packet to the fabric communication unit 150. The packet transmitted to the fabric communication unit 150 is transmitted to the communication device 100 of the specified destination.

Specifically, upon receipt of a request packet, the request packet transmission circuit 123 generates a packet to be transmitted to the fabric 160 such that the packet transmitted to the fabric 160 is to be appropriately routed. For example, in the case where the fabric 160 is Ethernet, the request packet transmission circuit 123 sets the destination to a correct MAC address.

If the request included in the request packet is memory read, the request packet transmission circuit 123 carries out conversion of the tag field in the packet. Having carried out conversion of the tag field in the packet, the request packet transmission circuit 123 registers, in the first packet management table 132, the conversion information including a set of the converted tag information, the destination information, and the information to be used during completion (completion information). The first packet management table 132 is a table for recording a tag value to be replaced, an in-use flag, a transmission destination identifier, and completion generating information. In this process, the request packet transmission circuit 123 uses a value unused in the first packet management table 132 for the tag field to be converted. The completion generating information includes, for example, original tag information, a requester ID, and a byte count.

If the request included in the request packet is memory write, the request packet transmission circuit 123 does not register any information in the first packet management table 132 because no completion is to be returned.

The response packet reception circuit 125 is connected to the PCIe device 110 and the fabric communication unit 150.

The response packet reception circuit 125 receives a response packet from the fabric communication unit 150. Having received a response packet, the response packet reception circuit 125 extracts a PCIe packet from the response packet. The response packet reception circuit 125 refers to the first packet management table 132 to determine to which request the response has been given. If there is an applicable request, the response packet reception circuit 125 restores the original tag field and the original requester ID included in the information stored in the first packet management table 132, and replaces the transmission destination identifier field with its own ID. That is, when a completion is received, the response packet reception circuit 125 updates the completion information in the first packet management table 132. When all the completions for the applicable memory read are received, the response packet reception circuit 125 deletes the in-use flag for the applicable tag. As a result, in the information processing device 10, the converted packet is transmitted to the root port 11 of the subject device as if the device for communication 15 in the subject device has given the response.

The destination management table 131 is used when the destination determination circuit 122 receives a packet. The destination management table 131 stores transfer information used for determining to which device a request packet is to be transferred. For example, the destination management table 131 stores information regarding the transmission destination information processing device 10 of a request packet in association with a high-order bit of a memory address.

FIG. 5 shows an example of the destination management table 131. In the example of the destination management table 131 shown in FIG. 5, any one of a plurality of the information processing devices 10 is associated with the first two bits of an address. In the example of the destination management table 131 shown in FIG. 5, other four information processing devices 10 are accessed by using a memory space allocated by the fabric communication unit 150. In the case of using the destination management table 131 shown in FIG. 5, four information processing devices 10 can be identified by using high-order two bits (00, 01, 10, and 11) of memory addresses.

In addition, the destination management table 131 can be changed dynamically. That is, in the destination management table 131, the communication devices 100 assigned to the individual addresses can be changed with time. In the destination management table 131 shown in FIG. 5, devices A to D are assigned to the individual addresses at time T1. A conceivable method for assigning devices A to D to addresses may be, for example, setting through the use of registers or the like or determining the assignment by the communication devices through communications. At time T2, if the high-order two bits of an address is 00, the device assigned thereto is changed from device A to device E. At time T3, device A, which was assigned at time T1 to the high-order two bits 00 of an address, is re-assigned to the high-order two bits 10 of an address. In this way, every device connected to the fabric can be accessed by using the destination management table 131 to register any device at any time.

The first packet management table 132 (also referred to as a PCIe packet management table) is used when the request packet transmission circuit 123 receives memory read. In the first packet management table 132, the destination information for a packet (transmission destination identifier) and the information needed during completion (completion information) are registered based on the tag information replaced by the request packet transmission circuit 123. In addition, the first packet management table 132 stores a flag (also referred to as an in-use flag) indicating whether the tag to be replaced is in use. The in-use flag is set when the request packet transmission circuit 123 transmits a packet with a replaced tag to the fabric 160.

FIG. 6 shows an example of the first packet management table 132 (also referred to as the PCIe packet management table). In the first packet management table 132, the destination information for a packet (transmission destination identifier) and the information needed during completion (also referred to as completion generating information) are registered based on the replaced tag information.

In addition, the first packet management table 132 stores a flag (also referred to as an in-use flag) indicating whether the tag to be replaced is in use. The in-use flag in the first packet management table 132 is set to 0 when the tag is not in use. On the other hand, when the request packet transmission circuit 123 transmits a packet with a replaced tag to the fabric, the in-use flag in the first packet management table 132 is set to 1 to indicate that the tag is in use. When all the flags are set to in-use, the request packet transmission circuit 123 can no longer replace a tag. For this reason, when all the flags are set to in-use (1), the PCIe device 110 is caused to stop receiving packets.

When communication with a destination is discontinued while the corresponding in-use flag is set in the first packet management table 132, the information processing device 10 that has issued the request detects a completion timeout. Upon detecting that the communication has been discontinued, the information processing device 10 notifies the response packet reception circuit 125 that a completion is to be autonomously returned. Then, in order to autonomously create a completion, the information processing device 10 uses the completion generating information in the first packet management table 132. In addition, the information processing device 10 deletes the in-use flag of the corresponding request.

The foregoing has described an example of the configuration of the requester unit 120. Note that the configuration of the requester unit 120 illustrated in FIG. 4 is merely an example, and the configuration of the requester unit 120 of the present example embodiment is not limited to the precise forms.

[Completer Unit]

Figure 7:
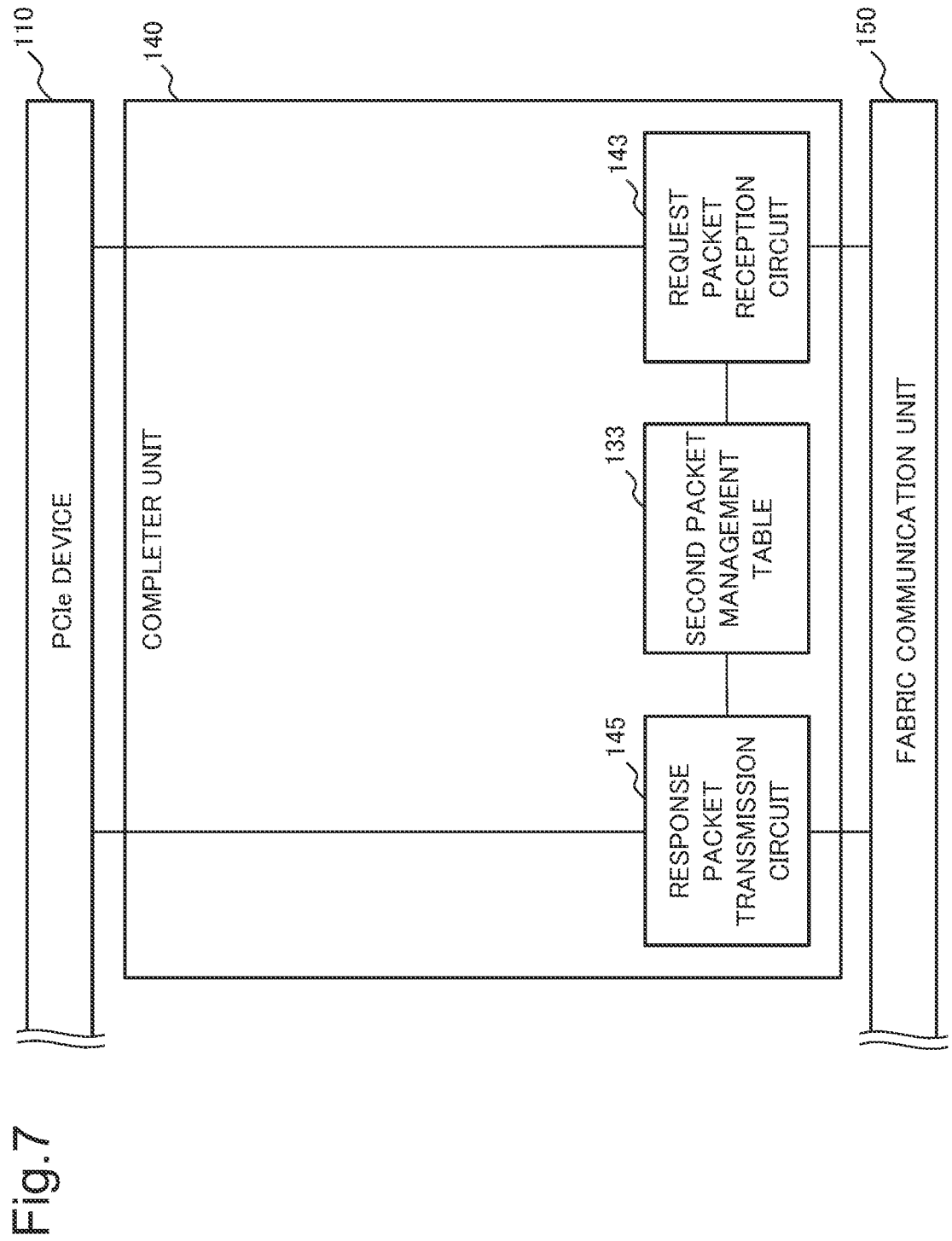
FIG. 7 is a block diagram illustrating an example of a configuration of a completer unit included in the communication device according to an example embodiment of the present invention.

Referring to the drawings, the following describes the completer unit 140 included in the communication device 100. FIG. 7 is a block diagram illustrating an example configuration of the completer unit 140. As illustrated in FIG. 7, the completer unit 140 includes a request packet reception circuit 143 and a response packet transmission circuit 145. The completer unit 140 further includes a second packet management table 133. The second packet management table 133 is stored in a storage circuit (not illustrated). The second packet management table 133 may be stored in a storage area different from the storage areas in the storage circuit where the destination management table 131 and the first packet management table 132 are stored.

The request packet reception circuit 143 is connected to the PCIe device 110 and the fabric communication unit 150. In addition, the request packet reception circuit 143 refers to the second packet management table 133. The request packet reception circuit 143 receives a request packet from the fabric communication unit 150 via the fabric 160. The request packet reception circuit 143 extracts a PCIe packet from the received request packet and carries out conversion of the packet. Specifically, the request packet reception circuit 143 replaces the transmission source identifier field in the packet with the transmission source identifier of the subject device and carries out conversion of the tag field.

The request packet reception circuit 143 stores the conversion information in the second packet management table 133. The second packet management table 133 is a table for recording conversion information including a set of the converted tag information, an in-use flag regarding the tag information, and the destination information regarding the requester (also referred to as a transmission source identifier). The request packet reception circuit 143 gives, to the tag field to be converted, the tag information that is unused in the second packet management table. The converted packet is transmitted to the root port 11 as if the converted packet has been issued by the device for communication 15 of the subject device.

If the request included in the request packet is memory write, the process is completed upon transmission of the packet. On the other hand, if the request included in the request packet is memory read, a response packet (also referred to as a completion packet) is returned from the root port 11 of the subject device and is passed to the response packet transmission circuit 145 of the subject device.

The response packet transmission circuit 145 refers to the second packet management table 133 to determine to which request the received response packet is responding. If there is any applicable request, the response packet transmission circuit 145 acquires the transmission source identifier from the information stored in the second packet management table 133, restores the original tag field, and then transmits the response packet to the fabric 160. The response packet transmitted from the response packet transmission circuit 145 reaches the response packet reception circuit 125 in the communication device 100 included in the information processing device 10 of the specified destination.

The second packet management table 133 is used when the request packet reception circuit 143 receives memory read. FIG. 8 shows an example of the second packet management table 133 (also referred to as a fabric packet management table). In the second packet management table 133, the destination information regarding the transmission source (also referred to as a transmission source identifier) and the original tag information are registered based on the tag information to be replaced.

In addition, the second packet management table 133 stores a flag (also referred to as an in-use flag) indicating whether the tag to be replaced is in use. The in-use flag is set when the request packet reception circuit 143 transmits a packet with a replaced tag to the PCIe device 110. On the other hand, the in-use flag is deleted when all the completions for the corresponding memory read are received. When all the flags are set to in-use, the request packet reception circuit 143 causes the fabric communication unit 1500 to stop receiving packets because no tag can be replaced.

The foregoing has described an example of the configuration of the completer unit 140. Note that the configuration of the completer unit 140 illustrated in FIG. 7 is merely an example, and the configuration of the completer unit 140 of the present example embodiment is not limited to the precise forms.

(Operation)

Referring to the drawings, the following describes operations of the communication device 100. Description is given below about an operation for accessing the memory 13 in the information processing device 10-2 from the information processing device 10-1. Although the following describes an example in which two information processing devices 10 are connected to the fabric 160, no specific limitation is imposed on the number of connected devices. For example, in the case where the fabric 160 is Ethernet, an unlimited number of devices can be connected and the memory 13 in any device can be accessed as long as every MAC address is a unique value.

Figure 9:
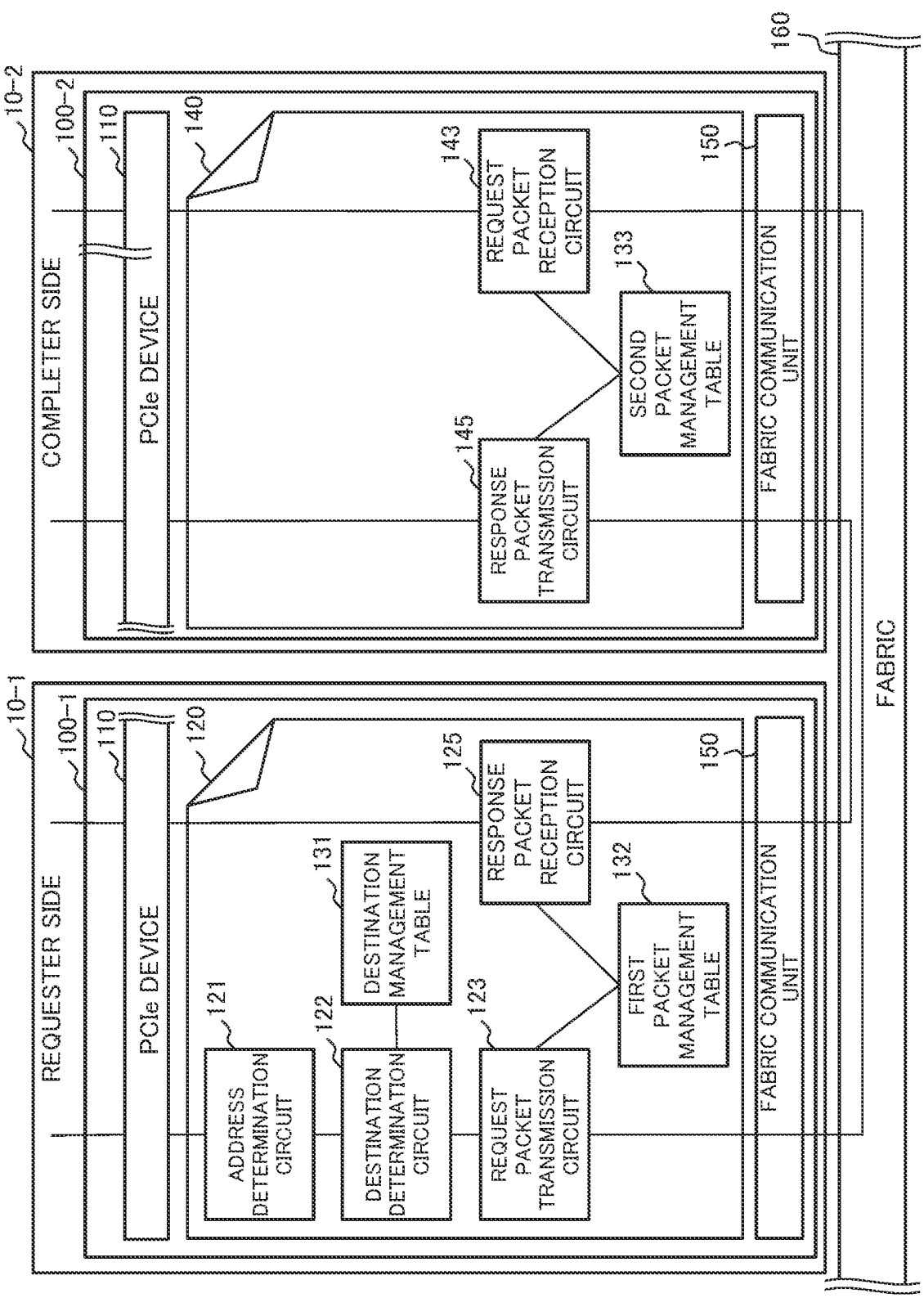
FIG. 9 is a conceptual diagram for explaining operations of the communication device according to an example embodiment of the present invention.

FIG. 9 is a conceptual diagram for explaining operations of the communication device 100. In the example in FIG. 9, the information processing device 10-1 in which the communication device 100-1 is mounted is defined as the requester side, while the information processing device 10-2 in which the communication device 100-2 is mounted is defined as the completer side. In FIG. 9, the completer unit 140 in the requester-side communication device 100-1 and the requester unit 120 in the completer-side communication device 100-2 are omitted.

It is assumed that the following two settings are made in the device for communication 15 of each information processing device 10 before a memory space in another information processing device 10 (hereinafter referred to as another device) is accessed.

(1) As in a general I/O device, a PCI bus number and a BAR space are allocated to the device for communication 15 by PCI enumeration software.

(2) When the operating system (OS) is started, a device driver for the device for communication 15 is loaded and the initial settings necessary for operation are made.

With reference to FIGS. 3 and 9, description is given below about operations for accessing the communication device 100-2 in the completer-side information processing device 10-2 from the communication device 100-1 in the requester-side information processing device 10-1, following the flowcharts in FIGS. 10 to 13.

[Request Process]

First, description is given below, following the flowchart in FIG. 10, about a request process carried out when the requester-side communication device 100-1 accesses the completer-side communication device 100-2. The request process is a process of transmitting a request packet received by the requester-side communication device 100-1 to the completer-side communication device 100-2 via the fabric 160. The description given below by following the flowchart in FIG. 10 assumes that the subject of operation is the communication device 100-1.

Figure 10:
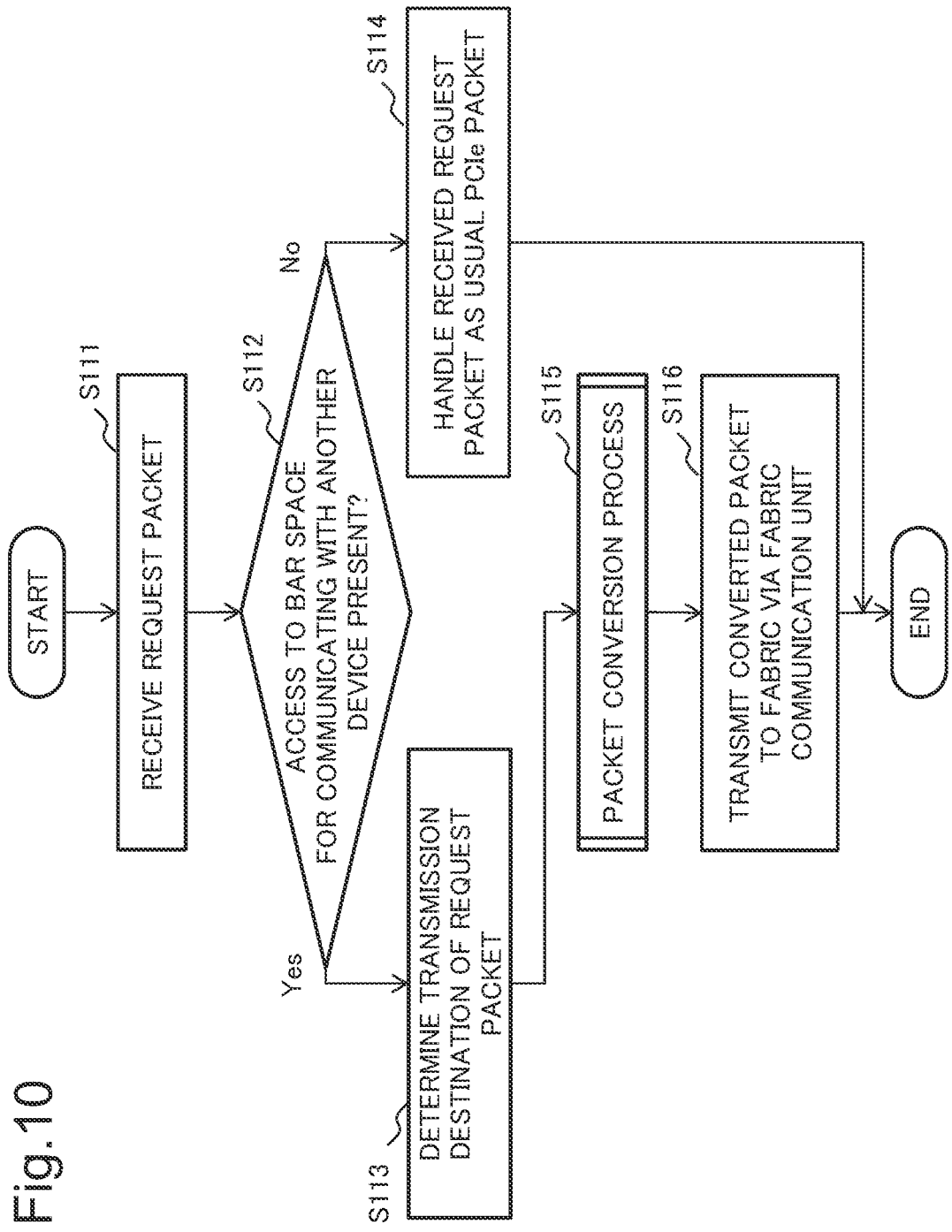
FIG. 10 is a flowchart for explaining an example of a request process performed by the communication device according to an example embodiment of the present invention.

With reference to FIG. 10, in the first place, the communication device 100-1 receives a request packet from the root port 11 via the PCIe switch 14 (step S111).

Next, the communication device 100-1 determines whether access to the BAR space for communicating with another device is present (step S112).

If access to the BAR space for communicating with another device is present (Yes in step S112), the communication device 100-1 refers to the destination management table 131 to determine to which information processing device 10 the acquired request packet is to be transferred (step S113).

If access to the BAR space for communicating with another device is absent (No in step S112), the communication device 100-1 handles the acquired request packet as a usual PCIe packet (step S114).

Subsequent to step S113, the communication device 100-1 converts the acquired request packet into a packet to be transmitted to the fabric 160 (step S115).

Next, the communication device 100-1 transmits the converted packet to the fabric 160 via the fabric communication unit 150 (step S116). The packet transmitted to the fabric 160 is transmitted via the fabric 160 to the communication device 100-2 in the information processing device 10-2.

The foregoing has described the request process carried out when the requester-side communication device 100-1 accesses the completer-side communication device 100-2. Note that the request process carried out by following the flowchart in FIG. 10 is merely an example, and the request process performed by the information processing device 10 of the present example embodiment is not limited to the precise procedure.

[Packet Conversion Process]

Description is given below, following the flowchart in FIG. 11, about a packet conversion process carried out by the request packet transmission circuit 123 in the requester-side communication device 100. The packet conversion process is the process step S115 in the flowchart in FIG. 10. The description given below by following the flowchart in FIG. 11 assumes that the subject of operation is the request packet transmission circuit 123.

Figure 11:
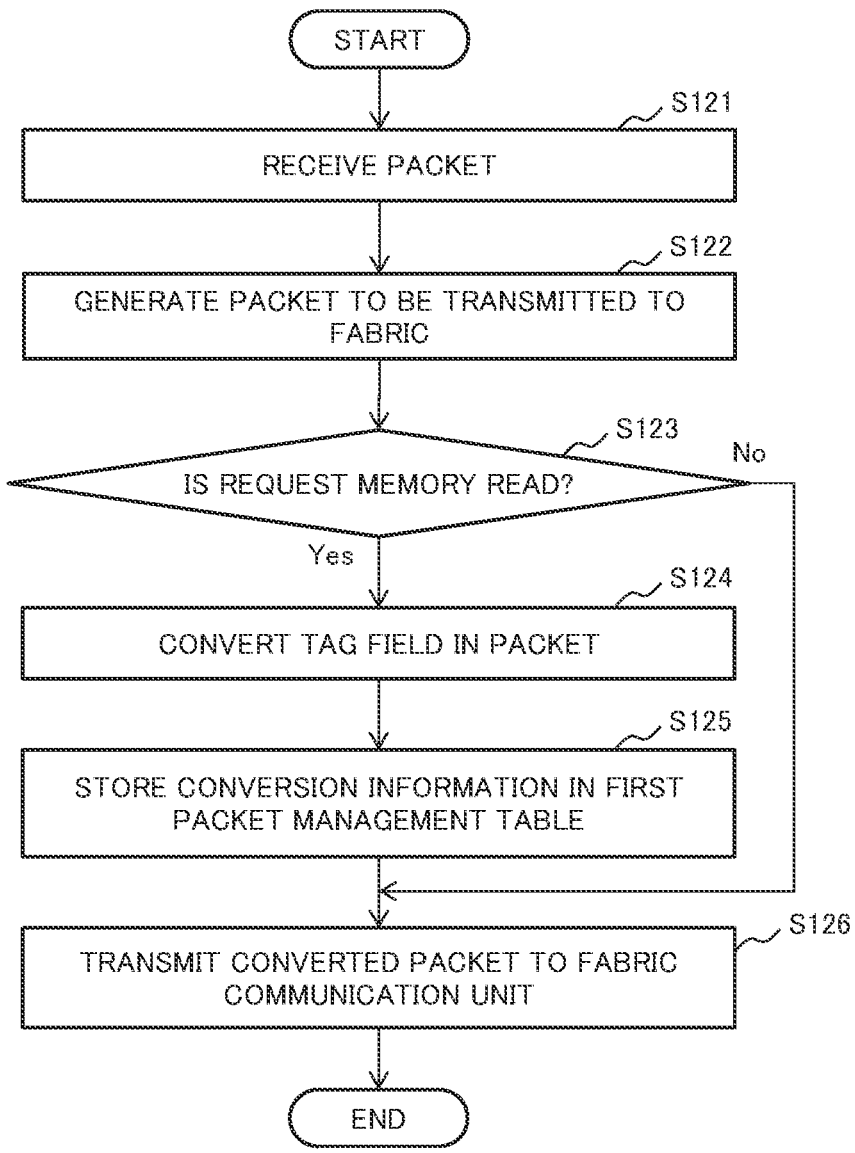
FIG. 11 is a flowchart for explaining an example of a packet conversion process performed by the communication device according to an example embodiment of the present invention.

With reference to FIG. 11, in the first place, the request packet transmission circuit 123 receives a packet from the destination determination circuit 122 (step S121).

Next, the request packet transmission circuit 123 generates a packet to be transmitted to the fabric 160 such that the packet is appropriately routed when the packet is transmitted to the fabric 160 (step S122). For example, in the case where the fabric 160 is Ethernet (registered trademark), the request packet transmission circuit 123 sets the destination included in the packet to a correct MAC address.

Next, if the request is memory read (Yes in step S123), the request packet transmission circuit 123 carries out conversion of the tag field in the packet (step S124). In this step, the request packet transmission circuit 123 converts the tag field in the packet into a tag unused in the first packet management table 132. On the other hand, if the request is memory write (No in step S123), the request packet transmission circuit 123 does not register any information in the first packet management table 132 because no completion is to be returned (goes to step S126).

Next, the request packet transmission circuit 123 stores, in the first packet management table 132, the conversion information including a set of the converted tag information, the destination information, and the completion generating information (step S125).

Then, the request packet transmission circuit 123 transmits the converted packet to the fabric communication unit 150 (step S126).

The foregoing has described the packet conversion process carried out by the request packet transmission circuit 123. Note that the packet conversion process in accordance with the flowchart in FIG. 11 is merely an example, and the packet conversion process carried out by the request packet transmission circuit 123 of the present example embodiment is not limited to the precise procedure.

[Completion Process]

Description is given below, following the flowchart in FIG. 12, about a completion process carried out when the completer-side communication device 100-2 is accessed from the requester-side communication device 100-1. The completion process is a process carried out by the completer-side communication device 100-2 for receiving the packet transmitted from the requester-side communication device 100-1 via the fabric 160 and responding to the request included in the packet. The description given below by following the flowchart in FIG. 12 assumes that the subject of operation is the communication device 100-2.

Figure 12:
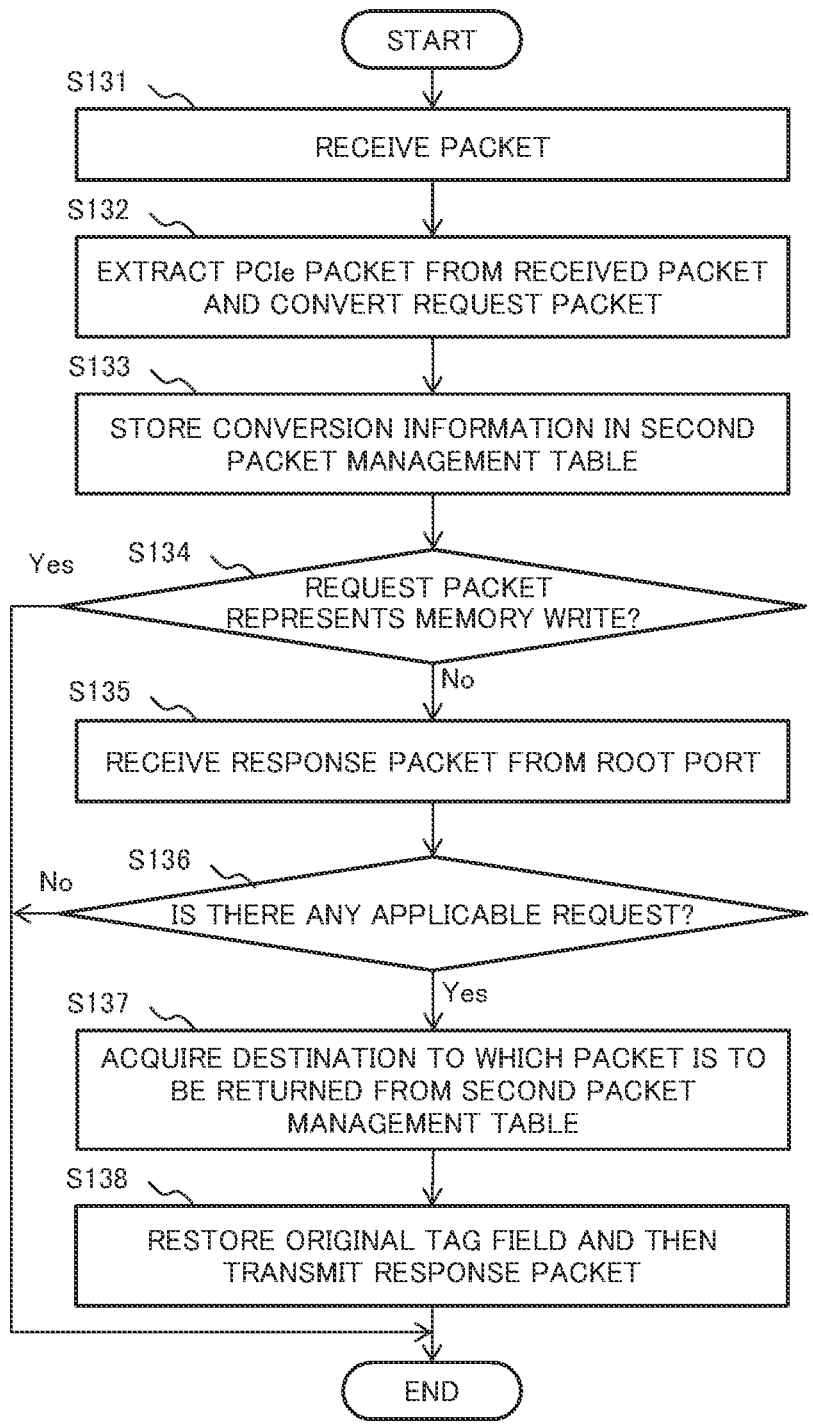
FIG. 12 is a flowchart for explaining an example of a completion process performed by the communication device according to an example embodiment of the present invention.

With reference to FIG. 12, in the first place, the communication device 100-2 receives a packet from the communication device 100-1 via the fabric 160 (step S131).

Next, the communication device 100-2 extracts a PCIe packet from the received packet and carries out conversion of the request packet (step S132). Specifically, the request packet reception circuit 143 replaces the requester ID field in the packet with its own requester ID and carries out conversion of the tag field. In this operation, the request packet reception circuit 143 converts the tag field into a tag field unused in the second management table.

Next, the communication device 100-2 stores, in the second packet management table 133, the conversion information including a set of the converted tag information and the destination information regarding the requester (step S133). The converted packet is transmitted to the root port 11 of the communication device 100-2 as if the converted packet has been issued by the device for communication 15 of the communication device 100-2.

Then, if the request packet represents memory write (Yes in step S134), the process in accordance with the flowchart in FIG. 12 is ended.

On the other hand, if the request packet represents memory read (No in step S134), a response packet is returned from the root port 11 of the communication device 100-2 and is passed to the response packet transmission circuit 145 (step S135).

Next, the communication device 100-2 refers to the second packet management table 133 to determine whether any applicable request is included in the response packet (step S136).

If there is an applicable request (Yes in step S136), the communication device 100-2 acquires the destination to which a packet is to be returned from the information stored in the second packet management table 133 (step S137). If there is no applicable request (No in step S136), the process in accordance with the flowchart in FIG. 12 is ended.

Subsequent to step S137, the communication device 100-2 restores the original tag field and transmits the response packet to the fabric 160 (step S138). The response packet transmitted to the fabric 160 is received by the fabric communication unit 150 of the communication device 100-1.

The foregoing has described the completion process carried out when the completer-side communication device 100-2 is accessed from the requester-side communication device 100-1. Note that the completion process carried out by following the flowchart in FIG. 12 is merely an example, and the completion process performed by the information processing device 10 of the present example embodiment is not limited to the precise procedure.

[Response Receiving Process]

Description is given below, following the flowchart in FIG. 13, about a response receiving process carried out by the requester-side communication device 100-1 for receiving a response packet from the completer-side communication device 100-2. The description given below by following the flowchart in FIG. 13 assumes that the subject of operation is the communication device 100-1.

With reference to FIG. 13, in the first place, the communication device 100-1 receives a response packet from the communication device 100-2 (step S141).

The communication device 100-1 extracts a PCIe packet from the received packet (step S142).

The communication device 100-1 refers to the first packet management table 132 to determine whether any applicable request is included in the response packet (step S143).

If there is any applicable request (Yes in step S143), the communication device 100-1 converts the acquired the response packet into a packet to be transmitted to the root port 11 (step S144). Specifically, the communication device 100-1 restores the original tag field and the original requester ID included in the information stored in the first packet management table 132, and replaces the transmission destination identifier field with its own identifier. If there is no applicable request (No in step S143), the process in accordance with the flowchart in FIG. 13 is ended.

Then, the communication device 100-1 transmits the converted packet to the root port 11 (step S145). The packet converted by the communication device 100-1 is transmitted to the root port 11 of the communication device 100-1 as if the device for communication 15 of the communication device 100-1 has made a response.

The foregoing has described the response receiving process in which the requester-side communication device 100-1 receives a response packet from the completer-side communication device 100-2. Note that the response receiving process carried out by following the flowchart in FIG. 13 is merely an example, and the response receiving process performed by the communication device 100 of the present example embodiment is not limited to the precise procedure.

The procedure described above with reference to FIGS. 10 to 13 allows the communication device 100-1 to access the memory 13 in the communication device 100-2 via the fabric 160. Likewise, via the fabric 160, the information processing device 10 included in the information processing system 1 is allowed to access the memory 13 in any information processing device 10 included in the information processing system 1.

As described above, the communication device according to the present example embodiment is mounted in each of a plurality of the information processing devices connected to a fabric. The communication device of the present example embodiment includes the serial interface, the requester unit, the fabric communication unit, and the completer unit. The serial interface transmits and receives a first packet compliant with the Peripheral Component Interconnect Express (PCIe) standard. The requester unit acquires the first packet from the serial interface. The requester unit converts the acquired first packet into a second packet that is to be transmitted and received through a fabric among a plurality of the information processing devices that share a virtually extended memory space by using a device identifier specific to each information processing device. The fabric communication unit transmits and receives the second packet via the fabric. The completer unit acquires the second packet from the fabric communication unit and generates a response packet to the request included in the acquired second packet.

For example, the requester unit includes the address determination circuit, the destination management table, the destination determination circuit, the first packet management table, the request packet transmission circuit, and the response packet reception circuit. The address determination circuit acquires a first packet from the serial interface and determines, based on the acquired first packet, whether access to another information processing device is present or absent. The destination management table associates a bit included in a memory address with each of a plurality of the information processing devices sharing a memory space. The destination determination circuit acquires the first packet from the address determination circuit, refers to the destination management table to determine the transmission destination of the first packet, and outputs the first packet and the device identifier of the information processing device to which the first packet is to be transmitted. In the first packet management table, first conversion information is registered including a set of the device identifier of the transmission destination of the first packet, the completion information, and a tag value given to a combination of the device identifier of the transmission destination and the completion information. The completion information is used for completion of a response packet to the first packet. The request packet transmission circuit acquires, from the destination determination circuit, the first packet and the device identifier of the transmission destination of the first packet, and converts the first packet to be transmitted to the information processing device sharing the memory space to the second packet to be transmitted via the fabric. In addition, if the request included in the first packet is memory read, the request packet transmission circuit carries out conversion of the tag value in the second packet, and transmits the second packet containing the converted tag value to the fabric communication unit. Then, the request packet transmission circuit registers the first conversion information in the first packet management table. The response packet reception circuit acquires the second packet from the fabric communication unit, refers to the first packet management table to convert the second packet into the first packet, and updates the first conversion information in the first packet management table.

For example, the destination management table stores a record in which a high-order bit of a memory address that is associated with each of a plurality of the information processing devices sharing a memory space is associated with each of the information processing devices. In addition, for example, in the destination management table, the record in which a high-order bit of a memory address that is associated with each of a plurality of the information processing devices sharing a memory space is associated with each of the information processing devices is stored in association with a plurality of times.

For example, the completer unit includes the second packet management table, the request packet reception circuit, and the response packet transmission circuit. In the second packet management table, the second conversion information is registered including a set of a tag value in the second packet and a device identifier specific to the transmission source information processing device. The request packet reception circuit acquires the second packet from the fabric communication unit, and generates a first packet by replacing the value of the device identifier in the acquired second packet with the device identifier of the subject device and carrying out conversion of the tag value. The request packet reception circuit registers the second conversion information in the second packet management table. If the request included in the request packet is memory read, the response packet transmission circuit acquires, from the serial interface, a response packet to the request included in the first packet. On the basis of the second conversion information registered in the second packet management table, the response packet transmission circuit generates a second packet by performing conversion of the device identifier and the tag value in the acquired response packet. The response packet transmission circuit transmits the generated second packet to the fabric communication unit, and updates the second conversion information registered in the second packet management table.

For example, in the first packet management table, the first conversion information is registered including a set of the device identifier specific to the transmission destination information processing device of the first packet, the completion information, and a tag value associating the device identifier with the completion information. The completion information is used for converting the first packet into the second packet. In the second packet management table, the second conversion information is registered including a set of the device identifier specific to the transmission source information processing device of the second packet and a tag value associated with the device identifier.

Furthermore, for example, a flag indicating the use status of a tag value is set in the first packet management table and the second packet management table. On the basis of the flags in the second packet management table, the requester unit and the completer unit use an unused tag value.

As described above, the information processing devices according to the present example embodiment constitute an information processing system based on a technology capable of extending PCIe to a fabric. In the present example embodiment, a memory space is virtually extended by using an identifier uniquely assigned to each device as high-order bits of the memory space. In the present example embodiment, non-transparent bridging (NTB) is performed based on an address of the virtually extended memory space. As a result, according to the present example embodiment, any memory space of any information processing device can be accessed by the devices connected to a fabric, and the memory space can be shared among a plurality of computers.

In general, to share a memory space among a plurality of computers, Remote Direct Memory Access (RDMA), Non-Transparent Bridge (NTB), or the like is used. In the case of RDMA, processing overhead is present because each computer individually manages the memory space. In the case of NTB, although a memory space of another computer can be directly accessed, a limitation of 64-bit addresses is imposed because NTB is based on PCIe.

On the other hand, regarding the fabric connection used in the present example embodiment, the fabric can be dynamically connected only when necessary and can be removed if unnecessary. Furthermore, by using the fabric connection, data transfers between a plurality of servers and a storage can be done independently at the same time.

In the case of NTB, a memory can be shared by connecting two information processing devices by PCIe through a bridge. However, NTB basically allows a memory to be shared only between two devices because NTB is based on PCIe, which mandates peer-to-peer. To share a memory among a plurality of devices using NTB, a plurality of NTB spaces need to be combined to establish communication, and thus overhead is incurred.

The present example embodiment allows PCIe based on peer-to-peer to establish a plurality of simultaneous connections by using a management table, and thus NTB with a plurality of devices is achieved, whereby a memory space can be shared by a plurality of information processing devices connected to a fabric.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-224572, filed on Nov. 30, 2018, the disclosure of which is incorporated herein in its entirety by reference.

REFERENCE SIGNS LIST

1 Information processing system
10 Information processing device
11 Root port
12 CPU
13 Memory
14 PCIe switch
15 Device for communication
16, 17 End point
100 Communication device
110 PCIe device
120 Requester unit
121 Address determination circuit
122 Destination determination circuit
123 Request packet transmission circuit
125 Response packet reception circuit
131 Destination management table
132 First packet management table
133 Second packet management table
140 Completer unit
143 Request packet reception circuit
145 Response packet transmission circuit
150 Fabric communication unit
160 Fabric

What is claimed is:

1. A communication device mounted in each of a plurality of information processing devices connected to a fabric, the communication device comprising:
 a serial interface for transmitting and receiving a first packet compliant with a Peripheral Component Interconnect Express (PCIe) standard;
 a requester circuit configured to acquire the first packet from the serial interface and convert the first packet that has been acquired into a second packet that is transmitted and received via the fabric among the plurality of the information processing devices sharing a memory space that is virtually extended by using a device identifier specific to each of the information processing devices;
 a fabric communicator circuit configured in a PCIe port and configured to transmit and receive the second packet via the fabric; and
 a completer circuit configured to acquire the second packet from the fabric communicator circuit and generate a response packet to a request included in the second packet that has been acquired, wherein
 the requester circuit comprises:
 an address determination circuit that acquires the first packet from the serial interface and determines, based on the first packet that has been acquired, whether access to another one of the information processing devices is present;

a destination management table in which each of the plurality of the information processing devices sharing the memory space is associated with a bit included in a memory address;

a destination determination circuit that acquires the first packet from the address determination circuit, refers to the destination management table to determine a transmission destination of the first packet, and outputs the device identifier of the transmission destination of the first packet, the transmission destination being one of the information processing devices, and the first packet;

a first packet management table in which first conversion information is registered, the first conversion information including a set of the device identifier of the transmission destination of the first packet, completion information used for performing completion of the response packet to the first packet, and a tag value given to a combination of the device identifier of the transmission destination and the completion information;

a request packet transmission circuit that acquires the device identifier of the transmission destination of the first packet and the first packet from the destination determination circuit, and converts the first packet to be transmitted to the information processing devices sharing the memory space into the second packet to be transmitted and received via the fabric; and a response packet reception circuit that acquires the second packet from the fabric communicator circuit, refers to the first packet management table to convert the second packet into the first packet, and updates the first conversion information in the first packet management table.

2. The communication device according to claim 1, wherein
the request packet transmission circuit, in response to the request included in the first packet been memory read, performs conversion of the tag value in the second packet, and transmits the second packet containing the converted tag value to the fabric communicator circuit while registering the first conversion information in the first packet management table.

3. The communication device according to claim 2, wherein
the destination management table stores a record in which a high-order bit of a memory address that is associated with each of the plurality of the information processing devices sharing the memory space is associated with each of the information processing devices.

4. The communication device according to claim 2, wherein
the destination management table stores the record in which a high-order bit of a memory address that is associated with each of the plurality of the information processing devices sharing the memory space is associated with each of the information processing devices is stored in association with a plurality of times.

5. The communication device according to claim 2, wherein
the completer circuit comprises:
a second packet management table in which second conversion information including a set of the tag value in the second packet and the device identifier specific to a transmission source being one of the information processing devices is registered;
a request packet reception circuit that acquires the second packet from the fabric communicator circuit replaces a value of the device identifier in the second packet that has been acquired with the device identifier of a subject device while performing conversion of the tag value to generate the first packet, and registers the second conversion information in the second packet management table; and
a response packet transmission circuit that acquires, in response to the request included in the first packet been memory read, the response packet to the request included in the first packet from the serial interface, performs, based on the second conversion information registered in the second packet management table, conversion of the device identifier and the tag value included in the response packet that has been acquired and generates the second packet, transmits the second packet that has been generated to the fabric communicator circuit, and updates the second conversion information registered in the second packet management table.

6. The communication device according to claim 5, wherein
the first conversion information is registered in the first packet management table, the first conversion information includes a set of the device identifier specific to the transmission destination of the first packet, the transmission destination being one of the information processing devices, the completion information used for converting the first packet into the second packet, and the tag value associating the device identifier with the completion information, and
the second conversion information is registered in the second packet management table, the second conversion information includes a set of the device identifier specific to the transmission source of the second packet, the transmission source being one of the information processing devices, and the tag value associated with the device identifier.

7. The communication device according to claim 6, wherein
a flag indicating use status of the tag value is set in the first packet management table and the second packet management table, and
the requester circuit and the completer circuit use, based on the flag in the second packet management table, the tag value that is unused.

8. An information processing device in which the communication device according to claim 1 is mounted.

9. An information processing system comprising:
a plurality of information processing devices;
a fabric connected to the plurality of the information processing devices; and
a communication device mounted in each of the plurality of the information processing devices, the communication device comprising:
a serial interface for transmitting and receiving a first packet compliant with a Peripheral Component Interconnect Express (PCIe) standard;
a requester circuit configured to acquire the first packet from the serial interface and convert the first packet that has been acquired into a second packet that is transmitted and received via the fabric among the plurality of the information processing devices sharing a memory space that is virtually extended by using a device identifier specific to each of the information processing devices;

a fabric communicator circuit configured in a PCIe port and configured to transmit and receive the second packet via the fabric; and a completer circuit configured to acquire the second packet from the fabric communicator circuit and generate a response packet to a request included in the second packet that has been acquired, wherein the requester circuit comprises:

an address determination circuit that acquires the first packet from the serial interface and determines, based on the first packet that has been acquired, whether access to another one of the information processing devices is present;

a destination management table in which each of the plurality of the information processing devices sharing the memory space is associated with a bit included in a memory address;

a destination determination circuit that acquires the first packet from the address determination circuit, refers to the destination management table to determine a transmission destination of the first packet, and outputs the device identifier of the transmission destination of the first packet, the transmission destination being one of the information processing devices, and the first packet;

a first packet management table in which first conversion information is registered, the first conversion information including a set of the device identifier of the transmission destination of the first packet, completion information used for performing completion of the response packet to the first packet, and a tag value given to a combination of the device identifier of the transmission destination and the completion information;

a request packet transmission circuit that acquires the device identifier of the transmission destination of the first packet and the first packet from the destination determination circuit, and converts the first packet to be transmitted to the information processing devices sharing the memory space into the second packet to be transmitted and received via the fabric; and a response packet reception circuit that acquires the second packet from the fabric communicator, refers to the first packet management table to convert the second packet into the first packet, and updates the first conversion information in the first packet management table.

10. A communication method in an information processing system including a plurality of information processing devices connected to a fabric, the communication method comprising:

receiving a first packet compliant with a Peripheral Component Interconnect Express (PCIe) standard;

converting the first packet that has been received into a second packet that is transmitted and received via the fabric among the plurality of the information processing devices sharing a memory space that is virtually extended by using a device identifier specific to each of the information processing devices;

transmitting and receiving the second packet via the fabric; and generating a response packet to a request included in the second packet that has been acquired, wherein acquiring the first packet from the serial interface, determining, based on the first packet that has been acquired, whether access to another one of the information processing devices is present, determining a transmission destination of the first packet with reference to a destination management table in which each of the plurality of the information processing devices sharing the memory space is associated with a bit included in a memory address, outputting the device identifier of the transmission destination of the first packet, the transmission destination being one of the information processing devices, and the first packet, converting the first packet to be transmitted to the information processing devices sharing the memory space into the second packet to be transmitted and received via the fabric, and converting the second packet into the first packet with reference to a first packet management table in which first conversion information is registered, the first conversion information including a set of the device identifier of the transmission destination of the first packet, completion information used for performing completion of the response packet to the first packet, and a tag value given to a combination of the device identifier of the transmission destination and the completion information, and updating the first conversion information in the first packet management table.

* * * * *